United States Patent [19]

McGann

[11] Patent Number: 4,865,335

[45] Date of Patent: Sep. 12, 1989

[54] METAL REINFORCED SEALING WASHER

[75] Inventor: Leo E. McGann, Cranford, N.J.

[73] Assignee: J D L Components Corporation, Kenilworth, N.J.

[21] Appl. No.: 228,161

[22] Filed: Aug. 4, 1988

[51] Int. Cl.⁴ .......................................... F16J 15/12
[52] U.S. Cl. ................................. 277/166; 277/186; 277/229
[58] Field of Search ............... 277/166, 178, 181–183, 277/186, 189, 227, 229, 233, 235 R

[56] References Cited

U.S. PATENT DOCUMENTS

| 1,157,574 | 10/1915 | Mueller | 277/186 |
| 3,062,557 | 11/1962 | Underwood | 277/166 X |
| 3,285,547 | 11/1966 | Henry | 277/227 X |
| 3,519,279 | 7/1970 | Wagner | 277/166 |
| 3,575,429 | 4/1971 | Spofford | 277/166 |

FOREIGN PATENT DOCUMENTS

| 462548 | 10/1968 | Switzerland | 277/166 |
| 431097 | 7/1935 | United Kingdom | 277/186 |

Primary Examiner—Robert S. Ward

[57] ABSTRACT

A sealing washer providing watertight connection as between electrical conduit parts and including a reinforcing element molded substantially completely within a body of flexible material except for spaced projections extending to a selected surface of the flexible material and serving to locate the reinforcing element accurately within the body of flexible material during the molding process.

3 Claims, 1 Drawing Sheet

METAL REINFORCED SEALING WASHER

BACKGROUND OF THE INVENTION

1. Field of the Invention

This invention relates to washers of flexible material, such as rubber or the like, especially for use in providing a water tight seal between separable connections as in electrical conduit connections or the fitting between an electrical conduit and a junction box. More particularly this invention relates to a novel and improved reinforcement for a flexible sealing washer.

2. Description of the Prior Art

The U.S. Pat. No. 3,575,429, Apr. 20, 1971 of Spofford recognizes the problem of uncontrolled distortion which may be encountered when an unreinforced sealing washer such as a plain rubber o-ring is used in an effort to attain a watertight seal. This Spofford U.S. patent discloses a metallic washer reinforcing element which extends largely exteriorly of the flexible washer. While the Spofford washer reinforcement technique does minimize uncontrolled distortion of the flexible washer, the cost of this disclosed arrangement is high and arrangement of the reinforcing element largely exteriorly of the flexible washer materially limits the portion of the flexible washer which is available to serve as the sealing agent in the connection which is desired to make watertight.

SUMMARY OF THE INVENTION

It is an object of the present invention to provide a reinforcing member of relatively inflexible material which is arranged primarily internally within the flexible sealing washer. Preferentially this object is attained by molding the flexible material of the sealing washer over the reinforcing member.

Another object of this invention is to provide a reinforced sealing washer which is highly cost effective to produce. Such cost effectiveness is attained largely by virtue of the permissible plain fat shape of the reinforcing member with no costly complicated configuration being required as in the prior art in order to accommodate retention of the flexible washer element thereto.

A wide variety of shapes for the reinforcing member may be used with this invention for adapting the sealing washer to special end uses. Particularly where a metallic reinforcing ring is used, the configuration may be produced cost effectively by simple sheet metal stamping processes. The reinforcing rings, for instance, may be formed with spaced projections extending to either the interior or the exterior surface of the finished sealing washer, the projection cooperating with locating bosses in the die in which the flexible sealing washer is molded to accurately locate the reinforcing ring in desired position within the finished washer, thus contributing in an additional fashion to the advantageousness and cost effectiveness of the sealing washer of this invention.

DESCRIPTION OF THE DRAWINGS

With the above and other objects and advantages in view, as will hereinafter appear, this invention comprises the devices, combinations, and arrangements of parts hereinafter described and illustrated in the accompanying drawings of preferred embodiments in which.

DETAILED DESCRIPTION

The preferred form of reinforced sealing washer illustrated in FIG. 1 will now be described with the reinforcing ring thereof shown in FIG. 2 and a die shown in FIG. 4 in which the washer of FIG. 1 may be molded.

Figure 1:
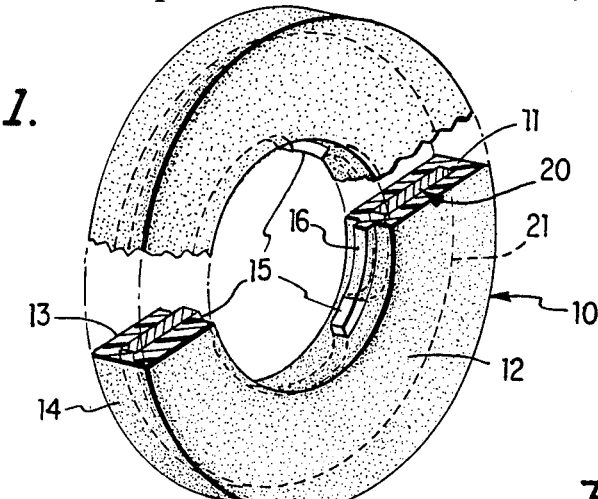
FIG. 1 is a perspective view of a reinforced sealing washer in accordance with this invention with portions broken away better to illustrate the reinforcing ring therein.

As shown in FIG. 1 the sealing washer indicated generally at 10 comprises flexible material such as rubber 11 formed in annular configuration with substantially flat parallel opposite sides 12 & 13, a plain circular external periphery 14, and a circular internal periphery 15 with a central inwardly projecting rib 16. Arranged within the annularly configured flexible material 11 of the washer 10 substantially equidistant from the parallel opposite sides 12 & 13 thereof is a flat annular reinforcing ring 20 formed of relatively inflexible material such for instance as metal. The reinforcing ring is formed with a circular external periphery 21 smaller in diameter than the external periphery 14 of the flexible material 11 and with an internal circular periphery 22 slightly larger in diameter than the internal periphery 15 of the flexible material. Projecting inwardly from the reinforcing ring are a plurality of projections 23 each terminating in circular arcs 24 of substantially the same internal diameter as that of the projecting rib 16 of the flexible material.

Figure 4:
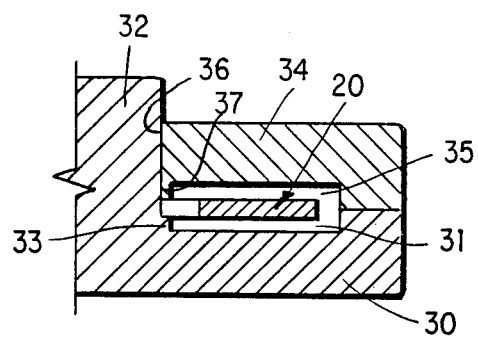
FIG. 4 is a cross sectional view of a portion of the die suitable for molding of the reinforced sealing washer shown in FIG. 1.

With reference to FIG. 4 a portion of the die is illustrated in which the washer 10 of FIG. 1 is molded. The bottom portion 30 of the die, in addition to a cavity 31 having approximately one-half of the cross sectional configuration of the flexible material 11 of the sealing washer is formed with a central raised boss 32 of circular shape corresponding in diameter to that of the washer rib 16 and that of the circular arcs 24 defined by the internal diameter of the reinforcing ring projections 23. A shoulder 33 formed at the base of the boss 32 is engaged by the reinforcing ring projections 23 to support the reinforcing ring 20 within the die cavity 31. A top portion 34 of the die is formed with a cavity 35 having approximately one-half of the cross sectional configuration of the flexible material of the sealing washer and with an internal diameter 36 matching that of the boss 32. A depending projection 37 adjacent the internal diameter 36 of the top die portion abuts and retains the reinforcing ring 20 within the die. A gate (not shown) is provided into which the flexible material, such as rubber or the like, may be introduced into the cavities 31, 35 to form the sealing washer shown in FIG. 1.

Figure 5:
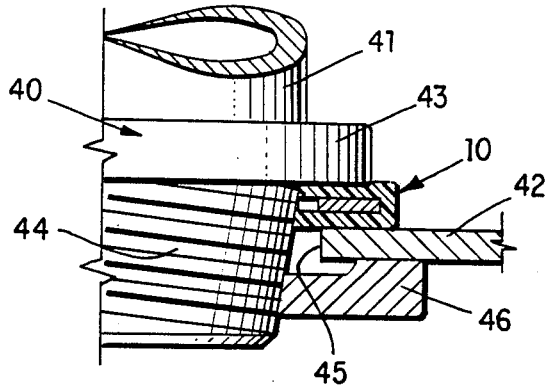
FIG. 5 is a cross sectional view of an electrical conduit connection with a junction box showing the reinforced sealing washer of this invention as it is used to render the connection watertight.

FIG. 5 illustrates the sealing washer of FIG. 1 in place between the connection 40 of an electrical conduit 41 and a junction box 42. The connection 40 includes a circular flange 43 and an externally threaded portion 44 which is inserted through a circular knock-out 45 in the junction box 42. A nut 46 on the threaded portion of the connection 40 compresses the sealing washer 10 which is placed between the junction box 42 and the connection flange 43.

The reinforcing ring 20 limits possible distortion of the flexible material 11 of the sealing washer so that the formation of moisture leakage paths due to washer distortion is prevented. Limited deformation of the flexible material 11 of the sealing washer 10 is permitted which as shown in FIG. 5 can force contact of the flexible material tightly against the threaded portion 44 of the connector at each side of the reinforcing ring projections 23. This coupled with the continuous layer of flexible material along each side of the washer uninterrupted by the reinforcing ring provides a particularly effective moisture seal between the connector flange 43, the connector threaded portion 44 and the junction box 42.

Figures 2, 3:
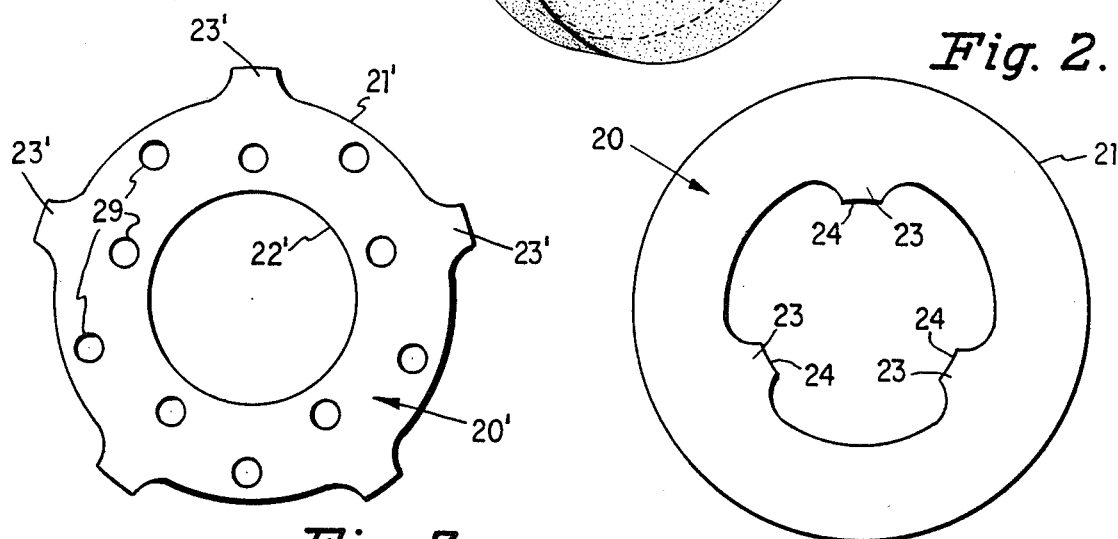
FIG. 2 is a plan view of the reinforcing ring which is illustrated in FIG. 1.
FIG. 3 is a plan view of an alternative form of reinforcing ring.

Numerous variations are possible in the shape and arrangement of the reinforcing ring in accordance with this invention, as may be found advantageous to suit specific requirements FIG. 3 illustrates one example of such a variant. Indicated at 20' in FIG. 3 is a reinforcing ring in which the outer periphery 21' is formed with spaced outwardly extending projections 23' with the inner periphery 22' being devoid of projections. A die for molding a sealing washer over the reinforcing ring 20' would of course, require a ring supporting shoulder adjacent the outer peripheral portion of the mold cavity. FIG. 3 also illustrates apertures 29 which may be formed through the reinforcing ring. It will be appreciated that ribs, grooves, or any other surface irregularities may be punched or otherwise formed in the reinforcing ring as desired without departing from the principles of this invention.

Having set forth the nature of this invention what is claimed here is:

1. A reinforced sealing washer for providing watertight connection between separable electrical conduit parts or the like, said washer comprising an annular body of molded flexible material having inner and outer circular peripheral surfaces and parallel planar side surfaces, a reinforcing member formed of relatively inflexible material encased substantially completely within said body of flexible material, and spaced projections extending from said reinforcing member, each said projection terminating coextensive with a selected surface of said body of flexible material.

2. A reinforced sealing washer as set forth in claim 1 in which said reinforcing member is located substantially equidistant from said parallel planar side surfaces of said body of flexible material as the result of cooperation of said projections from said reinforcing member and locating surfaces in a die for forming said flexible material.

3. A reinforced sealing washer as set forth in claim 1 in which said reinforcing member comprises an annular metallic ring, and in which said projections from said reinforcing member extend radially inward from the internal periphery of said metallic ring.

* * * * *